Patented Apr. 29, 1952

2,594,706

UNITED STATES PATENT OFFICE 2,594,706

ISOMERIZATION OF UNSATURATED HYDROCARBONS

Morag Lauchlan Allan, Norton-on-Tees, England, assignor to Imperial Chemical Industries Limited, a corporation of Great Britain No Drawing. Application May 12, 1950, Serial No. 161,720. In Great Britain May 30, 1949

5 Claims. (Cl. 260—678)

This invention relates to the isomerisation of allene.

It has already been proposed to subject allene hydrocarbons to an isomerisation treatment in the vapour phase and in the presence of a suitable catalyst to produce dienes and acetylenes. For example, using a catalyst comprising floridin earth in such a process, 1:1 dimethyl allene leads to the production of 2-methyl butadiene 1:3 and isopropyl acetylene, while 1-methyl allene yields butadiene 1:3 and ethyl acetylene, and allene yields methyl acetylene.

We have found that in the vapour phase isomerisation of allene hydrocarbons, the type of catalyst used exerts considerable influence on the efficiency of the process. In particular we have found that enhanced results are obtained by using a catalyst comprising materials selected from the classes hereinafter defined.

The present invention thus provides a process for the isomerisation of allene to methylacetylene in which the hydrocarbon is brought into contact in the vapour phase and at elevated temperature with a hydrocarbon conversion catalyst comprising material selected from the following classes:

(a) Silica together with one or more of the oxides: alumina, zirconia, thoria, titania, beryllia and boria, (b) The material obtained by treating with silicon tetrafluoride, hydrogen fluoride, fluorine or chlorine trifluoride, alumina or zirconia, or materials containing alumina together with silica, zirconia or beryllia, all the said oxides being substantially anhydrous.

(c) Alumina hydrogel treated with hydrofluoric acid, ammonium bifluoride, hydrofluosilicic acid, fluoboric acid or metallic fluosilicates or fluoborates, other than those of the alkali and alkaline earth metals.

(d) Aluminium trifluoride, or alumina together with one or more of the fluorides of aluminium, zirconium, bismuth, beryllium, zinc or chromium.

The most suitable catalyst for use in the present invention are those containing fluorine, and in particular it is preferred to employ a catalyst comprising alumina treated with a material selected from: silicon tetrafluoride, hydrogen fluoride, ammonium bi-fluoride, hydrofluosilicic acid and aluminium trifluoride.

It is also preferred in the process of the present invention to employ catalysts which are substantially free from alkali metal or alkaline earth metal compounds.

A catalyst for use according to the present invention may be prepared for example by precipitating, with ammonia, alumina in the form of a hydrogel from an aqueous solution of aluminium nitrate, separating the hydrogel, heating it for 15 hours at 400° to 700° C., and subsequently treating it with silicon tetrafluoride vapour, which has been dried, for example by passage through concentrated sulphuric acid. The treatment may be continued until no more silicon tetrafluoride is absorbed when the fluorine content of the catalyst is generally from 3 to 10% by weight of the alumina present. It should be understood that the alumina used in the preparation of this catalyst may be produced by methods other than that described.

The activity of the catalysts for use according to the present invention may be favourably influenced by the inclusion therein of small amounts of other substances such as silica, zirconia, thoria and aluminium phosphate, i. e,. when the presence of such substances is not already provided for by the selection of the catalyst material from the classes hereinbefore defined.

The temperature used in the process may conveniently lie within the range 150° to 400° C. In the process of the prior art, temperatures in the neighbourhood of 350° C. have been used in order to obtain, with the catalysts used, the most satisfactory conversion of allene and yield of isomer. However, in the present process we have found that comparable or even enhanced results can be obtained by using temperatures considerably lower than 350° C. We have found that very satisfactory results are obtained by operating in the temperature range of 240° to 300° C.

The space velocity at which the process is carried out exerts an important influence upon the pass yield and yield of methyl acetylene. Thus, when operating at 240° to 300° C., if the gas space velocity is below 50, i. e., less than 50 litres of allene, measured at 20° C. and 760 mm., are passed through the converter per hour per unit volume of catalyst filled space, the yield of methyl acetylene decreases, and if the space velocity is above 200, the conversion of allene decreases below the economic limit. Thus, when using a temperature of 240° to 300° C. the reaction is preferably carried out at a space velocity of 50 to 200. At temperatures above 300° C., higher space velocities may be employed, whereas at temperatures below 240° C., a lower space velocity may be used.

In this specification, the term "conversion" means the percentage of allene destroyed in the process, related to the volume of allene fed to the process. The term "pass yield" means the percentage of the methyl acetylene obtained related to the allene fed, while "yield" refers to the percentage of methyl acetylene obtained related to the amount of allne destroyed.

The following record of experiments illustrates the improvement obtained in the isomerisation of allene hydrocarbon when operating according to the process of the present invention.

Example 1

A catalyst consisting of alumina treated with silicon tetrafluoride was prepared as follows. Hydrated alumina was precipitated from an aqueous solution of aluminium nitrate,

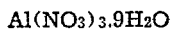

containing 3 moles per litre, by the addition of an excess of ammonia. The precipitate was separated, washed with cold water and heated for 15 hours at 500° C. After cooling, the alumina was formed into pellets which were then treated with silicon tetrafluoride vapour, the latter being first dried by passage over concentrated sulphuric acid. During treatment with silicon tetrafluoride, the temperature of the pellets rose to about 70° C. When the temperature commenced to fall, the reaction was judged complete. The catalyst then contained about 7% by weight of fluorine. 43 mls. of this catalyst were placed in a tube and maintained at a temperature of 280° C. while passing over them 1840 mls. of gaseous allene at a rate equivalent to 85 litres of gas per litre of catalyst space per hour, the gas volume being measured at a temperature of 20° C. and a pressure of 760 mm. 1750 mls. of gaseous product, measured as before, were obtained and this was found to contain by volume 47% of allene and 53% of methyl acetylene. The conversion of allene was therefore 55% and methyl acetylene was obtained in 50% pass yield which is equivalent to 91% yield.

Example 2

In a comparative experiment, 1750 mls. of allene were passed through the same apparatus as used in Example 1 but in this case 43 mls. of activated fluoridin earth catalyst were used. The temperature was maintained at 315° C. and the rate of passing the gaseous allene through the apparatus was 32 litres of gas per litre of catalyst space per hour. 760 mls. of a gaseous product were obtained which contained by volume 54% of allene and 46% of methyl acetylene. A considerable proportion of the allene was converted into a dark sticky liquid. The conversion of allene was 76% and methyl acetylene was obtained in 20% pass yield which is equivalent to a yield of only 26%.

A comparison of the above experimental results shows that despite the use of higher temperatures and lower rate of passage through the apparatus, the pass yield and particularly the yield of methyl acetylene are much lower when the floridin earth catalyst is used.

Example 3

In a second comparative test, 2820 mls. of allene, measured at 20° C. and 760 mm. pressure, were passed through the same apparatus, but in this case 25 mls. of activated floridin earth were used. The temperature was maintained at 250° C., and the rate of passing the allene through the apparatus was 84 litres of gas measured at 20° C. and 760 mm. per litre of catalyst space per hour. 2640 mls. of gaseous product was obtained, of which 2140 mls. were allene, and 500 mls. were methyl acetylene. This corresponds to a conversion of allene of 24%, and a pass yield of methyl acetylene of 18%, which corresponds to a yield of 74%. A comparison of these results with those obtained employing a silicon tetrafluoride-treated alumina catalyst shows the advantage of this catalyst over activated floridin earth.

Example 4

2170 mls. of gaseous allene (measured at 20° C. and 760 mm.) were passed at a space velocity of 189 litres of gas per litre of catalyst per hour, over 43 mls. of a silicon tetrafluoride on alumina catalyst, prepared as described in Example 1, maintained at a temperature of 250° C. 2100 mls. of product (measured at 20° C. and 760 mm.) were obtained and this contained 43% by volume of allene and 57% by volume of methyl acetylene. The conversion of allene was therefore 58.5% and methyl acetylene was obtained in 55% pass yield, this being equivalent to a yield of 94%.

Example 5

In a comparative experiment, 3300 mls. of gaseous allene (measured at 20° C. and 760 mm.) were passed at a space velocity of 180 litres of gas per litre of catalyst per hour over 25 mls. of an activated floridin earth catalyst, maintained at a temperature of 250° C. 3000 mls. of gaseous product were obtained, of which 450 mls. (i. e., 15% by volume) were methyl acetylene, the remainder being unchanged allene. This corresponds to a conversion of allene of 23%, a pass yield of methyl acetylene of 13.6% and a yield of methyl acetylene of 60%.

Example 6

The following catalysts were prepared for use in the process of the present invention.

*Catalyst A.*—Hydrated alumina was precipitated from an aqueous solution of aluminium nitrate by the addition of an excess of ammonia. An amount of ammonium bifluoride, equivalent to 30% by weight of the $Al_2O_3$ content of the precipitate, was added to the hydrated precipitate. The product was thoroughly mixed, dried at 450° C. and pelletted into 1/8" cylinders.

*Catalyst B.*—An alumina gel was precipitated from aluminium nitrate by the addition of ammonia. This gel was divided into 2 portions. The water content of the first portion was determined and sufficient glacial acetic was added to convert the water present in the hydrated oxide into a 17% by weight solution of acetic acid. The mixture was allowed to set to a firm gel. The second portion of hydrated alumina gel was treated with hydrofluoric acid solution to convert the alumina to aluminium trifluoride. The two portions were then thoroughly mixed, the mixture dried, ignited at a temperature of 450° C. and pelletted into 1/8" cylinders. This preparation was carried out in a manner such that the final aluminium trifluoride content was 20% by weight of the $Al_2O_3$ content of the final catalyst.

*Catalyst C.*—Alumina, prepared by the precipitation of aluminium nitrate with ammonia, was treated with an amount of hydrofluoric acid such that 30% of the $Al_2O_3$ content was converted to aluminium trifluoride, the remaining 70% of the $Al_2O_3$ being unchanged. The product was dried, ignited at 450° C., and pelletted into the form of ⅛" cylinders.

*Catalyst D.*—This was prepared in the same way as catalyst C, except that hydrofluosilicic acid was used instead of hydrofluoric acid. The amount of hydrofluosilicic acid employed was 10% by weight of the $Al_2O_3$ content of the hydrated alumina. The product was dried, ignited at 450° C. and pelleted into the form of ⅛" cylinders.

These catalysts were then used for the isomerisation of allene to methyl acetylene. The results are summarised in the table below.

Table

|  | Catalyst A | Catalyst B | Catalyst C | Catalyst D |
|---|---|---|---|---|
| Temperature °C | 250 | 250 | 250 | 250 |
| Volume of catalyst mls | 43 | 43 | 25 | 25 |
| Amount of allene passed (measured at 20 °C. and 760 mm.) mls | 2,150 | 1,910 | 1,880 | 1,920 |
| Rate of passage of allene (ml./hr.) | 4,610 | 4,410 | 2,510 | 2,560 |
| Space velocity ltr/ltr/hr | 107 | 102 | 100 | 102 |
| Volume of product mls | 1,930 | 1,350 | 1,380 | 1,540 |
| Volume of allene in product mls | 810 | 650 | 470 | 555 |
| Volume of methylacetylene in product mls | 1,020 | 650 | 870 | 960 |
| Conversion of allene percent | 62 | 66 | 75 | 71 |
| Pass yield of methylacetylene do | 47 | 34 | 46 | 50 |
| Yield of methylacetylene do | 76 | 51 | 62 | 70 |

I claim:

1. A process for the isomerization af allene to methyl-acetylene wherein said hydrocarbon is brought into contact in the vapor phase at a temperature of 240–300° C. with a catalytic substance comprising alumina treated prior to use with a fluorinating agent selected from the group consisting of silicon tetrafluoride and fluorine.

2. A process for the isomerization of allene to methyl-acetylene as set forth in claim 1 wherein said catalytic substance includes at least one anhydrous oxide selected from the group consisting of silica, zirconia and beryllia.

3. A process for the isomerization of allene to methyl-acetylene wherein said hydrocarbon is brought into contact in the vapor phase at a temperature of 240–300° C. with an alkali metal-free substance which comprises alumina treated prior to use with a fluorinating agent selected from the group consisting of silicon tetrafluoride and fluorine.

4. A process for the isomerization of allene to methyl-acetylene wherein said hydrocarbon is brought into contact in the vapor phase at a temperature of 240–300° C. and at a gas space velocity of 50 to 200 litres of allene per litre of catalyst-filled space per hour with a substance which comprises alumina treated prior to use with a fluorinating agent selected from the group consisting of silicon tetrafluoride and fluorine.

5. A process for the isomerization of allene to methyl-acetylene wherein said hydrocarbon is brought into contact in the vapor phase and at a space velocity of from 50 to 200 litres of allene per litre of catalyst-filled space per hour with a catalyst prepared by the treatment of sodium-free, substantially anhydrous alumina with silicon tetrafluoride, the catalyst containing from 3 to 10% by weight of fluorine based upon the alumina content, and the catalyst being maintained at a temperature of from 240–300° C. during the allene isomerization reaction.

MORAG LAUCHLAN ALLAN.

REFERENCES CITED

The following references are of record in the file of this patent:

UNITED STATES PATENTS

| Number | Name | Date |
|---|---|---|
| 2,322,622 | Fischer et al. | June 22, 1943 |
| 2,388,942 | Zimmerman | Nov. 13, 1945 |
| 2,471,647 | Oblad et al. | May 31, 1949 |

OTHER REFERENCES

Chemical Abstracts, vol. 31, p. 4264 (1937), citing J. Gen. Chem. (USSR), 6, 1806–14, 1892–6.